United States Patent
Champagne et al.

(10) Patent No.: US 8,612,094 B2
(45) Date of Patent: Dec. 17, 2013

(54) SYSTEMS AND METHODS INVOLVING VELOCITY DEPENDENT DAMPING

(75) Inventors: Anthony J. Champagne, Saginaw, MI (US); Michael K. Hales, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1071 days.

(21) Appl. No.: 12/046,523

(22) Filed: Mar. 12, 2008

(65) Prior Publication Data
US 2009/0234539 A1 Sep. 17, 2009

(51) Int. Cl.
B62D 6/00 (2006.01)

(52) U.S. Cl.
USPC ............................................ 701/41; 180/443

(58) Field of Classification Search
USPC .............. 701/36, 41, 42; 280/5.51, 21.1, 771; 180/204, 6.2, 6.24, 6.44, 6.6, 12, 252, 180/280, 285, 443, 444, 446, 447
See application file for complete search history.

(56) References Cited

U.S. PATENT DOCUMENTS

| | | | |
|---|---|---|---|
| 3,879,345 A * | 4/1975 | Furukawa et al. | 524/141 |
| 4,629,025 A * | 12/1986 | Brasier et al. | 180/422 |
| 5,504,403 A * | 4/1996 | McLaughlin | 318/432 |
| 5,668,722 A * | 9/1997 | Kaufmann et al. | 701/41 |
| 5,704,446 A * | 1/1998 | Chandy et al. | 180/446 |
| 5,719,766 A * | 2/1998 | Bolourchi et al. | 701/42 |
| 6,360,151 B1 * | 3/2002 | Suzuki et al. | 701/41 |
| 6,658,335 B2 * | 12/2003 | Kleinau | 701/41 |
| 7,188,701 B2 * | 3/2007 | Patankar | 180/446 |
| 7,242,161 B2 * | 7/2007 | Okamoto et al. | 318/432 |
| 7,523,806 B2 * | 4/2009 | Krieger et al. | 180/446 |
| 7,549,504 B2 * | 6/2009 | Krieger et al. | 180/444 |
| 7,733,047 B2 * | 6/2010 | Ikeda et al. | 318/432 |
| 8,423,245 B2 * | 4/2013 | Kimura et al. | 701/41 |
| 2002/0183907 A1 * | 12/2002 | Stiller | 701/37 |
| 2003/0001533 A1 * | 1/2003 | Kleinau et al. | 318/434 |
| 2003/0017910 A1 * | 1/2003 | Fattic et al. | 477/3 |
| 2003/0074120 A1 * | 4/2003 | Kleinau | 701/41 |
| 2003/0188914 A1 * | 10/2003 | Norman et al. | 180/404 |
| 2004/0162655 A1 * | 8/2004 | Patankar | 701/41 |
| 2005/0150711 A1 * | 7/2005 | Burton et al. | 180/443 |
| 2005/0182541 A1 * | 8/2005 | Tamaizumi et al. | 701/41 |
| 2007/0062755 A1 * | 3/2007 | Krieger et al. | 180/446 |

(Continued)

FOREIGN PATENT DOCUMENTS

| | | |
|---|---|---|
| EP | 1759956 A1 | 3/2007 |
| EP | 1764284 A2 | 3/2007 |
| EP | 1884447 A1 | 2/2008 |
| EP | 2006188 A2 | 12/2008 |

OTHER PUBLICATIONS

European Search Report and Office Action dated Jun. 19, 2009 for European Application No. 09154419.7.

(Continued)

*Primary Examiner* — Thomas Black
*Assistant Examiner* — Ce Li
(74) *Attorney, Agent, or Firm* — Cantor Colburn LLP

(57) ABSTRACT

A method for controlling a power steering system, the method including, receiving a first signal, determining a velocity from the first signal, determining a scale factor from a function of the velocity, multiplying the scale factor with a damping factor, and outputting a scaled damping factor.

30 Claims, 3 Drawing Sheets

(56) References Cited

U.S. PATENT DOCUMENTS

| | | | |
|---|---|---|---|
| 2008/0023256 A1* | 1/2008 | Krieger et al. | 180/444 |
| 2008/0208411 A1* | 8/2008 | Broecker | 701/42 |
| 2008/0228354 A1* | 9/2008 | Kimura et al. | 701/42 |
| 2009/0030575 A1* | 1/2009 | Kleinau et al. | 701/44 |
| 2009/0175601 A1* | 7/2009 | Ikeda et al. | 388/800 |
| 2010/0235047 A1* | 9/2010 | Kurishige et al. | 701/41 |

OTHER PUBLICATIONS

European Office Action dated Mar. 14, 2011 for European Application No. 09154419.7.

* cited by examiner

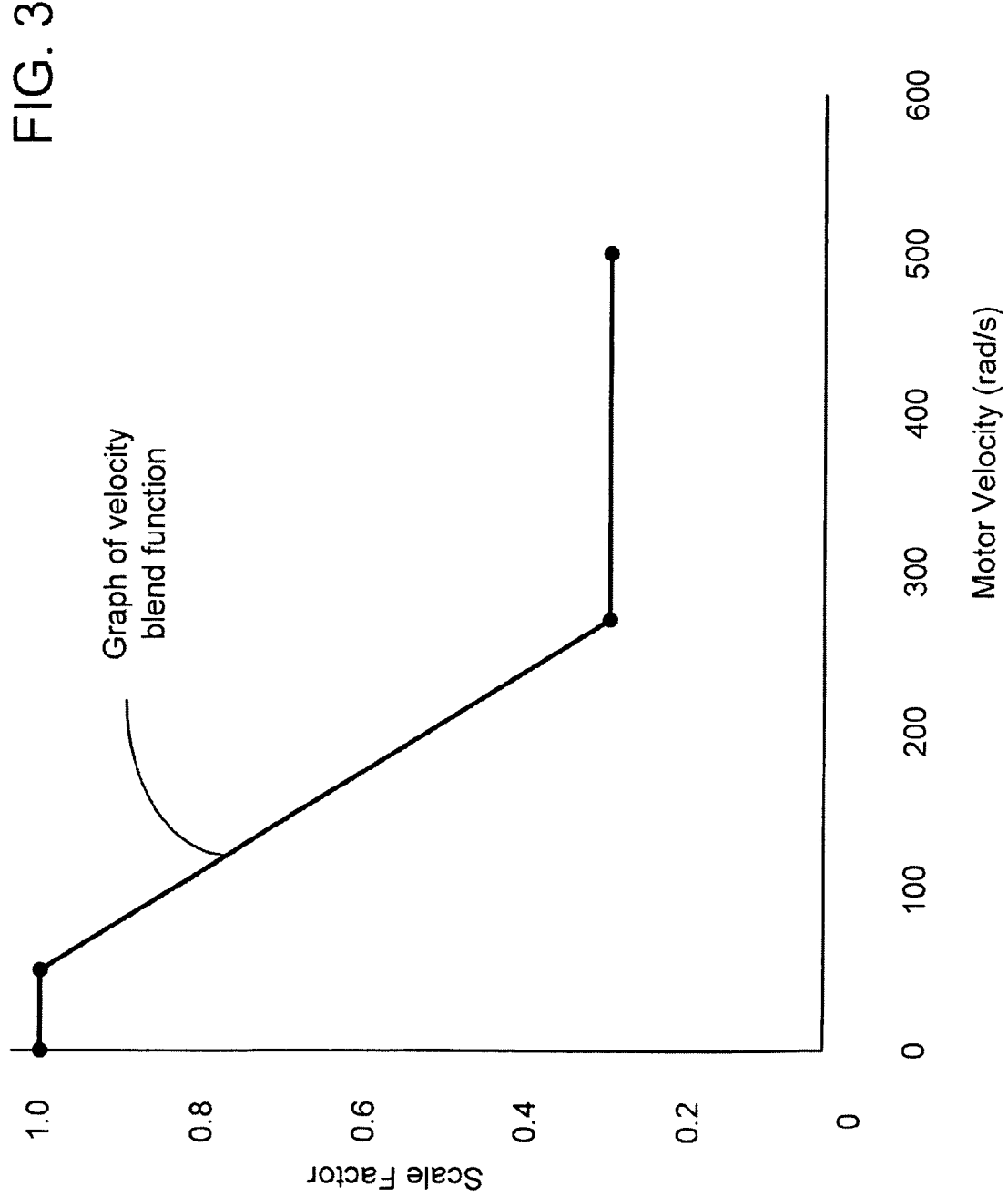

SYSTEMS AND METHODS INVOLVING VELOCITY DEPENDENT DAMPING

BACKGROUND

Power steering systems in vehicles are used to generate forces that assist a driver when steering a vehicle. Motors in the systems may induce torque disturbances in a system causing the system to be unstable. The power steering systems may use frequency dependent damping algorithms to increase system stability and to improve the rejection of system disturbances.

SUMMARY

The above described and other features are exemplified by the following Figures and Description in which a power steering system is disclosed that includes:

A method for controlling a power steering system, the method including, receiving a first signal, determining a velocity from the first signal, determining a scale factor from a function of the velocity, multiplying the scale factor with a damping factor, and outputting a scaled damping factor.

A power steering system comprising, a motor mechanically linked to a wheel, a sensor operative to send a first signal to a processor, and a processor operative to receive a first signal, determine a velocity from the first signal, determine a scale factor from a function of the velocity, multiply the scale factor with a damping factor, and output a scaled damping factor to the motor.

A control system comprising, a sensor operative to send a first signal to a processor, and a processor operative to receive a first signal, determine a velocity from the first signal, determine a scale factor from a function of the velocity, multiply the scale factor with a damping factor, and output a scaled damping factor to a motor.

BRIEF DESCRIPTION OF THE DRAWINGS

Referring now to the Figures wherein like elements are numbered alike:

FIG. 3 illustrates an exemplary embodiment of a graph of a velocity blend function in the control system of FIG. 2.

DETAILED DESCRIPTION

Power steering systems may include frequency dependent damping (FDD) to improve stability of the system, to reject velocity disturbances, and to filter system noise. A torque disturbance is a disturbance that originates in a motor. Different FDD calibration values may be used to vary the degree of torque disturbance rejection. In some systems a high gain value is used to provide an improvement in torque disturbance rejections that occur at relatively low hand wheel velocities, such as, for example, less than 5 RPM. However, the use of high gains may result in system instabilities at higher hand wheel speeds. It is desirable for a power steering control system that limits disturbances at low hand wheel speeds, but does not cause system instabilities at higher hand wheel speeds.

Figure 1:
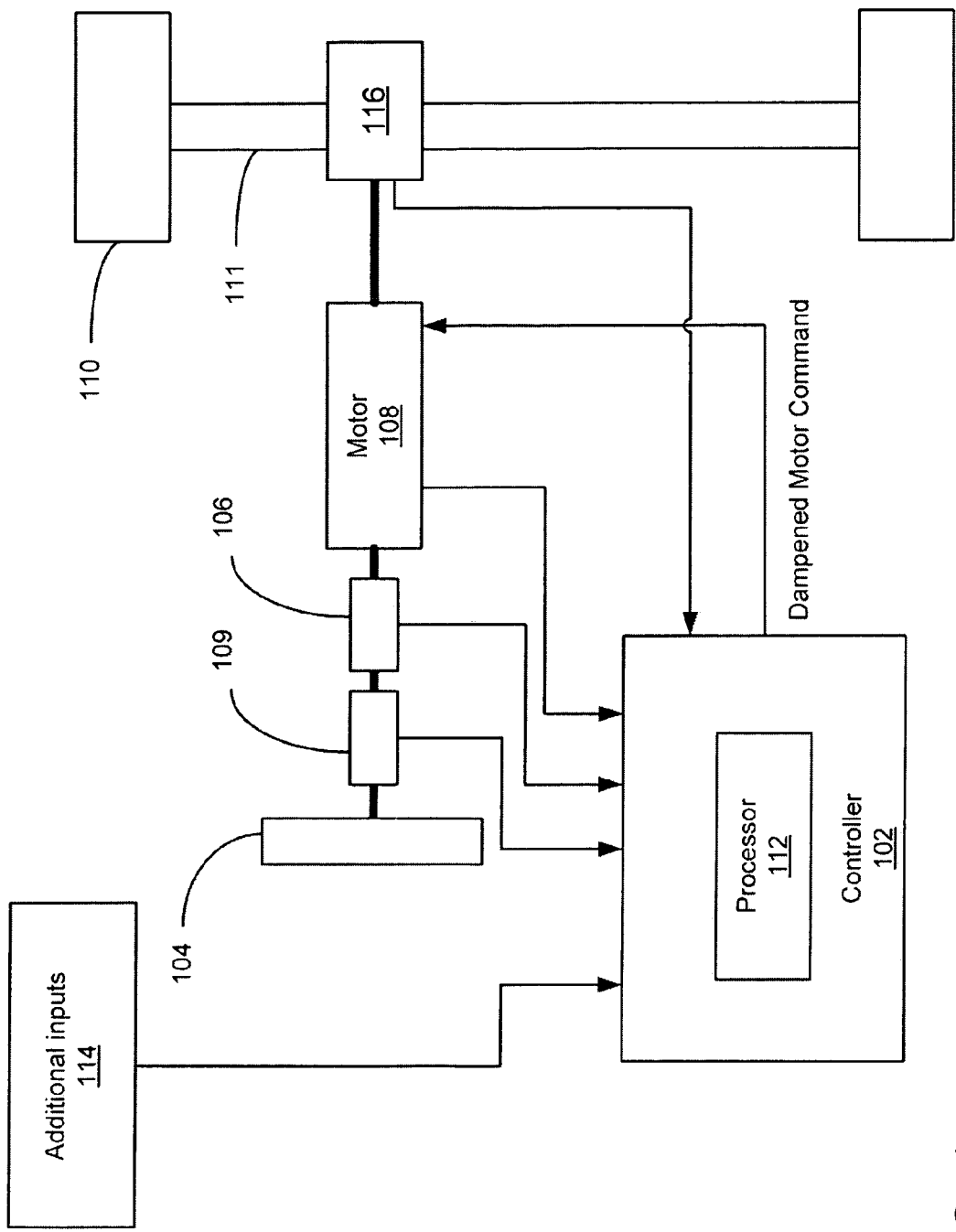
FIG. 1 illustrates and exemplary embodiment of a power steering system.

FIG. 1 illustrates an exemplary embodiment of a power steering control system. The system includes a hand wheel 104 connected to a motor 108. A torque sensor 106 may be disposed between the hand wheel 104 and the motor 108. A hand wheel position sensor 109 may be connected to the hand wheel 104. The motor 108 is connected to wheels 111 via, for example, a rack 111 or other suitable linkage. A controller 102 including a processor 112 is communicatively linked to the torque sensor 106, the motor 108, the hand wheel position sensor 109, and a rack position sensor 116. The controller 102 is also communicatively linked to additional inputs 114 that may include, for example, vehicle speed and user inputs.

In operation, the controller 102 receives torque signals from the torque sensor 106 that indicate the amount of torque a user has imposed on the hand wheel 104. The controller 102 processes the torque signals and motor position signals received from the motor 108, and sends motor commands to the motor 108. The motor 108 turns the wheels 110 via the rack 111. The controller 102 may also use the additional inputs 114 to scale the motor commands to the motor 108. Scaling the commands to the motor 108 results in a power steering system that offers smooth tactile feedback to the user, and turns the wheels 110 more effectively in a variety of driving conditions.

One method of scaling the commands to the motor 108 includes using frequency dependent damping functions having high gains that improve system performance and limit torque disturbances at low hand wheel 104 speeds. However, at higher hand wheel 104 speeds, the high gains used in frequency dependent damping functions may result in undesirable system instabilities.

Figure 2:
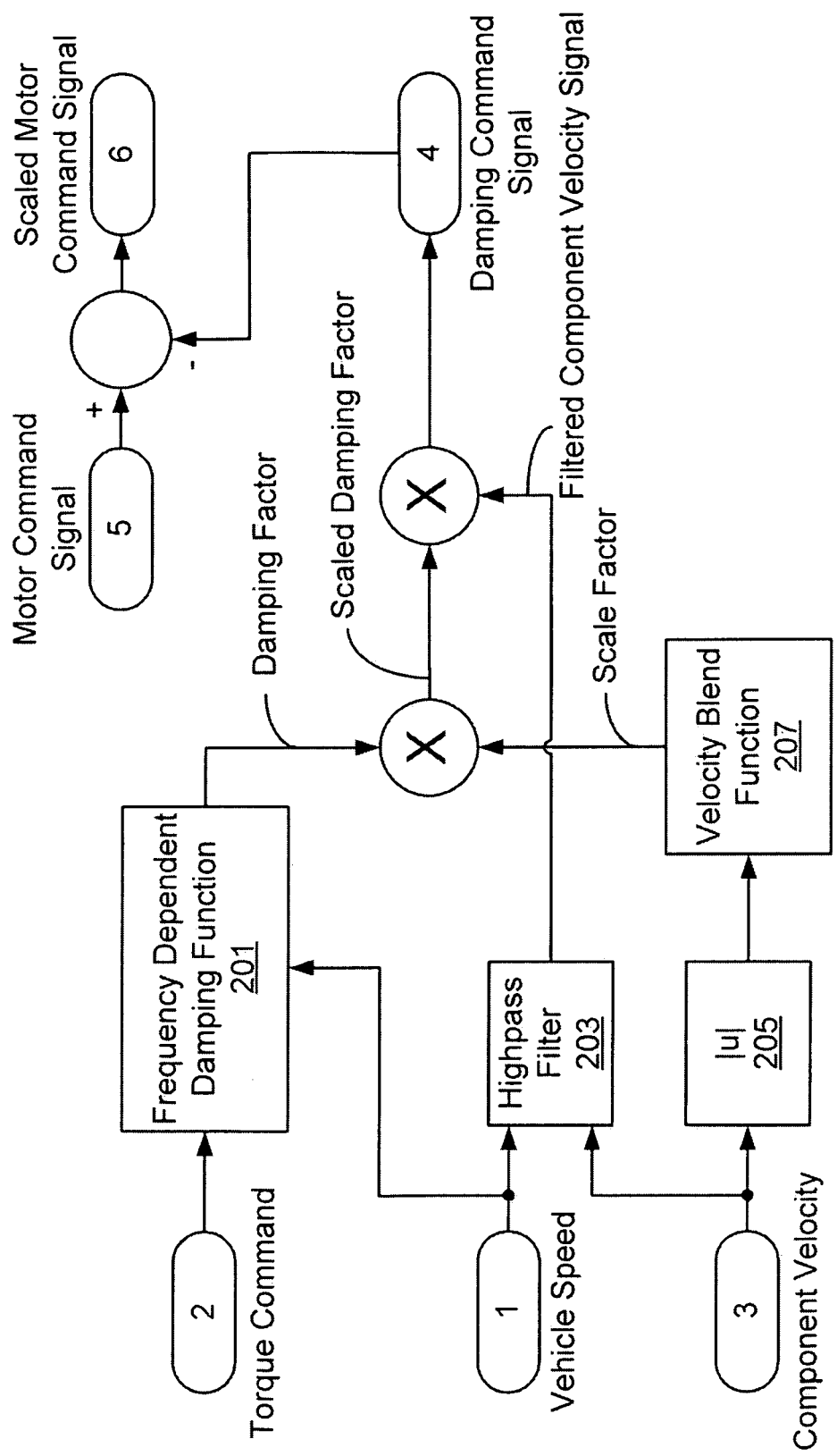
FIG. 2 illustrates an exemplary embodiment of a block diagram of a control system of the power steering system of FIG. 1.

FIG. 2 illustrates a block diagram of an exemplary embodiment of a control system of a power steering system. In operation, a torque command 2 is received resulting from a user imparting torque on the hand wheel 104 (of FIG. 1). The torque command 2 may, for example, be received from the torque sensor 106. The torque command 2 is processed in a frequency dependent damping function 201 to output a damping factor. The absolute value of a component velocity 3 may be taken in block 205. The component velocity may be determined by the controller 102 by, for example, receiving inputs from the motor 108, such as motor position inputs, inputs from the hand wheel position sensor 109, and inputs from the rack position sensor 116. The absolute value of the component velocity from block 205 is entered into a velocity blend function in block 207 that yields a scale factor. The scale factor and damping factor are multiplied resulting in a scaled damping factor. The component velocity 3 and a vehicle speed 1 input may be processed in a high pass filter in block 203 resulting in a filtered component velocity signal. The processing by the high pass filter in block 203 may include, for example, determining a high pass filter corner frequency as a function of the vehicle speed 1 input.

The scaled damping factor and the filtered velocity signal are multiplied resulting in a damping command signal 4. The damping command signal 4 may be combined with a motor command signal 5 resulting in a damped motor command signal 6 that may be sent to the motor 108. For example, the damping command signal 4 may be subtracted from the motor command signal 5.

The velocity blend function in block 207 is used to scale the damping in the system dependent on the component velocity of one of the components in the system, such as, for example, the motor 108 velocity, the hand wheel 104 velocity, and the rack 111 velocity. FIG. 3 illustrates an exemplary embodiment of a graphical representation of a velocity blend function.

Depending on design characteristics of the power steering system, the velocity blend function may be modified to optimize system performance. In the illustrated embodiment of FIG. 3, the motor velocity is input into the function to determine a scale factor. For example, at a motor velocity of 300 (rad/s) a scaling factor of 0.3 is output to be multiplied with the damping factor, while at a motor velocity of 20 (rad/s) a scaling factor of 1.0 is output. The scaled damping factor may be higher at lower motor velocities and lower at higher motor velocities. This results a control system that includes higher gains at low component velocities—improving system performance at low component velocities, and lower gains at higher component velocities—improving system performance at higher component velocities.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for controlling a power steering system, the method including:
   providing a controller, said controller:
      receiving a first signal;
      determining a component velocity from the first signal;
      determining a scale factor from a function of the component velocity; and
      multiplying the scale factor by a damping factor to produce
      a scaled damping factor; and
   providing said scaled damping factor to a motor driving the power steering system;
   wherein, within an operating range of the component velocity, the scale factor is linearly related to the component velocity such that the scale factor decreases monotonically as the component velocity increases within the operating range of the component velocity;
   wherein the method further comprises:
   filtering the first signal with a high pass filter to yield a filtered component velocity factor; and
   multiplying the scaled damping factor with the filtered component velocity factor to output a damping command signal.

2. A method for controlling a power steering system, the method including:
   providing a controller, said controller:
      receiving a first signal;
      determining a component velocity from the first signal;
      determining a scale factor from a function of the component velocity; and
      multiplying the scale factor by a damping factor to produce
      a scaled damping factor; and
   providing said scaled damping factor to a motor driving the power steering system;
   wherein, within an operating range of the component velocity, the scale factor is related to the component velocity such that the scale factor decreases monotonically as the component velocity increases within the operating range of the component velocity;
   wherein the method further comprises:
   filtering the first signal with a high pass filter to yield a filtered component velocity factor; and
   multiplying the scaled damping factor with the filtered component velocity factor to output a damping command signal.

3. The method of claim 2, wherein the high pass filter is a function of the component velocity.

4. The method of claim 2, wherein the first signal includes a motor position.

5. The method of claim 2, wherein the first signal includes a hand wheel position.

6. The method of claim 2, wherein the first signal includes a rack position.

7. The method of claim 2, wherein the method further comprises subtracting the damping command signal from a motor command signal to yield a scaled motor command signal.

8. The method of claim 2, wherein the scale factor is inversely proportional to the component velocity.

9. The method of claim 2, wherein the scale factor is inversely related to an absolute value of the component velocity.

10. The method of claim 2, wherein the scale factor is generally inversely related to the component velocity.

11. The method of claim 2, wherein the scale factor is generally increasing with decreasing component velocity and is generally decreasing with increasing component velocity.

12. A power steering system comprising:
   a motor mechanically linked to a wheel;
   a sensor operative to send a first signal to a processor; and
   a processor operative to receive a first signal, determine a component velocity from the first signal, determine a scale factor from a function of the component velocity, multiply the scale factor with a damping factor, and output a scaled damping factor to the motor;
   wherein, within an operating range of the component velocity, the scale factor is linearly related to the component velocity such that the scale factor decreases monotonically as the component velocity increases within the operating range of the component velocity;
   wherein the processor is further operative to:
   filter the first signal with a high pass filter to yield a filtered component velocity factor; and
   multiply the scaled damping factor with the filtered component velocity factor to output a damping command signal.

13. A power steering system comprising:
   a motor mechanically linked to a wheel;
   a sensor operative to send a first signal to a processor; and
   a processor operative to receive a first signal, determine a component velocity from the first signal, determine a scale factor from a function of the component velocity, multiply the scale factor with a damping factor, and output a scaled damping factor to the motor;
   wherein, within an operating range of the component velocity, the scale factor is related to the component velocity such that the scale factor decreases monotonically as the component velocity increases within the operating range of the component velocity;
   wherein the processor is further operative to:
   filter the first signal with a high pass filter to yield a filtered component velocity factor; and
   multiply the scaled damping factor with the filtered component velocity factor to output a damping command signal.

14. The system of claim 13, wherein the high pass filter is a function of the component velocity.

15. The system of claim 13, wherein the first signal includes a motor position.

16. The system of claim 13, wherein the first signal includes a hand wheel position.

17. The system of claim 13, wherein the first signal includes a rack position.

18. The system of claim 13, wherein the processor is further operative to subtract the damping command signal from a motor command signal to yield a scaled motor command signal.

19. A control system comprising:
  a sensor operative to send a first signal to a processor; and
  a processor operative to receive a first signal, determine a component velocity from the first signal, determine a scale factor from a function of the component velocity, multiply the scale factor with a damping factor, and output a scaled damping factor to a motor;
  wherein, within an operating range of the component velocity, the scale factor is linearly related to the component velocity such that the scale factor decreases monotonically as the component velocity increases within the operating range of the component velocity;
  wherein the processor is further operative to:
  filter the first signal with a high pass filter to yield a filtered component velocity factor; and
  multiply the scaled damping factor with the filtered component velocity factor to output a damping command signal.

20. A control system comprising:
  a sensor operative to send a first signal to a processor; and
  a processor operative to receive a first signal, determine a component velocity from the first signal, determine a scale factor from a function of the component velocity, multiply the scale factor with a damping factor, and output a scaled damping factor to a motor;
  wherein, within an operating range of the component velocity, the scale factor is related to the component velocity such that the scale factor decreases monotonically as the component velocity increases within the operating range of the component velocity;
  wherein the processor is further operative to:
  filter the first signal with a high pass filter to yield a filtered component velocity factor; and
  multiply the scaled damping factor with the filtered component velocity factor to output a damping command signal.

21. The system of claim 20, wherein the high pass filter is a function of the component velocity.

22. The system of claim 20, wherein the first signal includes a motor position.

23. The system of claim 20, wherein the first signal includes a hand wheel position.

24. The system of claim 20, wherein the first signal includes a rack position.

25. A method for controlling a power steering system, the method including:
  providing a controller;
  said controller receiving a first signal;
  determining a component velocity from the first signal;
  filtering the first signal with a high pass filter to yield a filtered component velocity factor;
  said controller determining a scale factor from a function of the component velocity;
  said controller multiplying the scale factor with a damping factor;
  said controller outputting a scaled damping factor to a motor;
  said controller multiplying the scaled damping factor with the filtered component velocity factor to output a damping command signal to said motor driving the power steering system;
  wherein, within an operating range of the component velocity, the scale factor is linearly related to the component velocity such that the scale factor decreases monotonically as the component velocity increases within the operating range of the component velocity.

26. A method for controlling a power steering system, the method including:
  providing a controller;
  said controller receiving a first signal;
  determining a component velocity from the first signal;
  filtering the first signal with a high pass filter to yield a filtered component velocity factor;
  said controller determining a scale factor from a function of the component velocity;
  said controller multiplying the scale factor with a damping factor;
  said controller outputting a scaled damping factor to a motor;
  said controller multiplying the scaled damping factor with the filtered component velocity factor to output a damping command signal to said motor driving the power steering system;
  wherein, within an operating range of the component velocity, the scale factor is related to the component velocity such that the scale factor decreases monotonically as the component velocity increases within the operating range of the component velocity;
  wherein the component velocity is a velocity of the motor.

27. A method as in claim 26, wherein the component velocity is a velocity of the rack.

28. A method as in claim 26, wherein the component velocity is a velocity of the handwheel.

29. A method as in claim 26, wherein the component velocity is a blended velocity based on at least two of the velocity of the motor, the velocity of the rack, and the velocity of the handwheel.

30. A method as in claim 29, wherein the blended velocity is determined based on a velocity blend function that depends upon vehicle speed.

* * * * *